US012723312B2

(12) United States Patent
Zhmud et al.

(10) Patent No.: US 12,723,312 B2
(45) Date of Patent: Sep. 1, 2026

(54) MANUFACTURING OF TRIBOLOGICAL HARDFACINGS ON PM AND AM ARTICLES

(71) Applicant: Tribonex AB, Uppsala (SE)

(72) Inventors: Boris Zhmud, Uppsala (SE); Mattias Sund, Vittinge (SE); Martin Hansén, Uppsala (SE); Linus Everlid, Uppsala (SE); Elias Forssbeck Nyrot, Uppsala (SE)

(73) Assignee: Tribonex AB, Uppsala (SE)

( * ) Notice: Subject to any disclaimer, the term of this patent is extended or adjusted under 35 U.S.C. 154(b) by 0 days.

(21) Appl. No.: 19/259,529

(22) Filed: Jul. 3, 2025

(65) Prior Publication Data

US 2026/0015734 A1 Jan. 15, 2026

(30) Foreign Application Priority Data

Jul. 11, 2024 (SE) .................................... 2450805-3

(51) Int. Cl.
*B24B 31/06* (2006.01)
*C23C 24/04* (2006.01)
*B33Y 40/20* (2020.01)

(52) U.S. Cl.
CPC ............... *C23C 24/04* (2013.01); *B33Y 40/20* (2020.01)

(58) Field of Classification Search
CPC ................................ C23C 24/04; B33Y 40/20
See application file for complete search history.

(56) References Cited

U.S. PATENT DOCUMENTS 4,125,637 A 11/1978 Tanner
10,316,712 B2 6/2019 Douglass et al.
(Continued)

FOREIGN PATENT DOCUMENTS

EP 3228406 A1 10/2017
RU 2072298 C1 1/1997
SE 2350096 A1 8/2024
WO WO-2023/055274 A1 4/2023

OTHER PUBLICATIONS

A. Molinari, E. Santuliana, I. Cristofolini, A. Rao, S. Libardi, P. Marconi, Surface 30 modifications induced by shot peening and their effect on the plane bending fatigue strength of a Cr—Mo steel produced by powder metallurgy, Materials Science and Engineering: A, vol. 528, Issue 6, 2011, pp. 2904-2911.
(Continued)

*Primary Examiner* — Nathan T Leong

(74) *Attorney, Agent, or Firm* — Harness, Dickey & Pierce, P.L.C.; Anthony G. Fussner

(57) ABSTRACT

A method for formation of hardfacings on an article comprises producing, by powder metallurgy or additive manufacturing, an article having a discontinuous surface. The article is exposed to impact items and to tungsten carbide particles, provided as tungsten carbide particles comprised in the impact items and/or tungsten particles provided directly in a process fluid as a dispersion. At least 80% of the tungsten carbide particles have particle sizes within the range of 0.1-5 μm. The impact items are bodies with an average diameter within the range of 0.1 to 10 mm. A velocity difference is created between the surfaces and the impact items, causing impacts between the impact items and the surfaces, giving polishing, induction of compressive stress, and/or densification of the surface. Tungsten carbide particles are embedded, hammering the tungsten carbide particles into the article by use of the energy of the impacts.

20 Claims, 5 Drawing Sheets

(56) References Cited

U.S. PATENT DOCUMENTS

| | | | | |
|---|---|---|---|---|
| 11,118,283 | B2 | 9/2021 | Hall et al. | |
| 11,859,108 | B2 | 1/2024 | Hutchinson et al. | |
| 2015/0336233 | A1* | 11/2015 | Twelves | B24B 31/064 451/326 |
| 2016/0256975 | A1* | 9/2016 | Versluys | B24B 31/003 |
| 2022/0241864 | A1 | 8/2022 | Noble et al. | |

OTHER PUBLICATIONS

Swedish Search Report for SE2450805-3 that is the parent application to the instant application; Feb. 7, 2025, 2 pages.

* cited by examiner

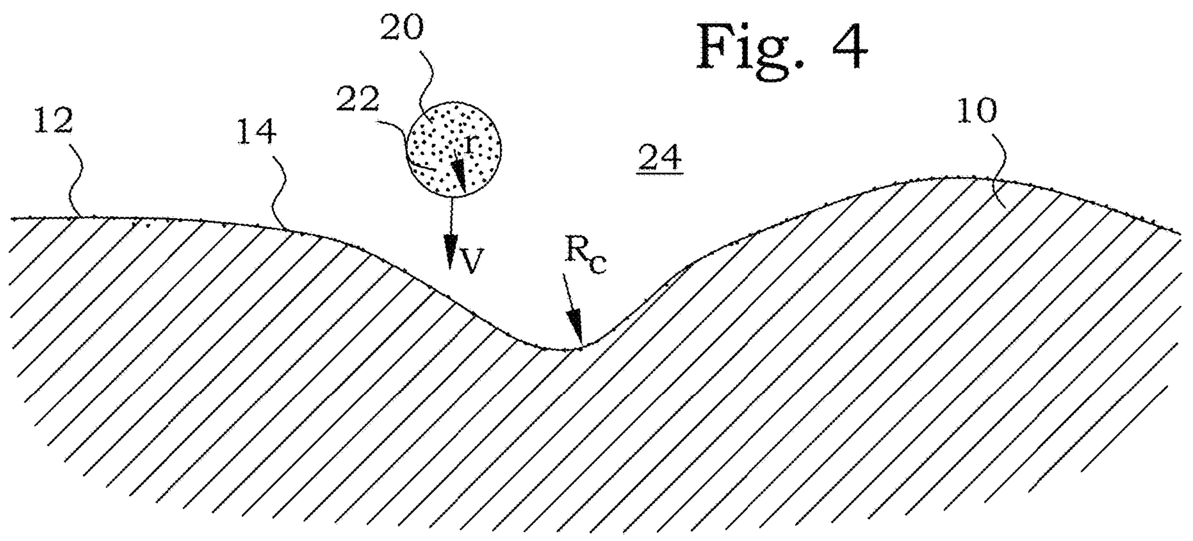
Fig. 4
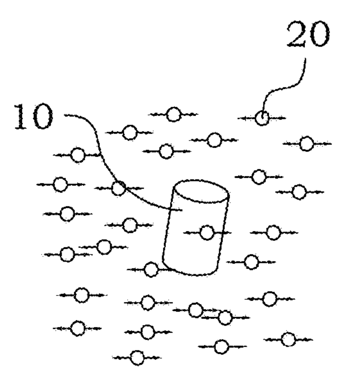
Fig. 5A
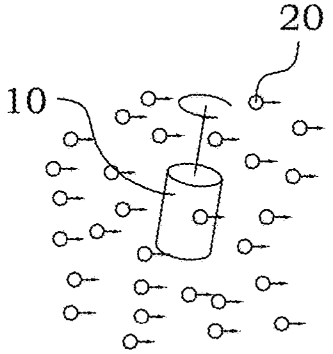
Fig. 5B
Fig. 5C
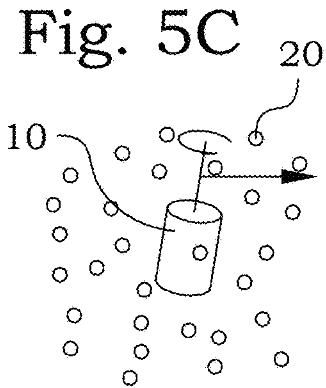

COEFFICIENT OF FRICTION
0.15
0.10
0.05
0

CONVENTIONALLY GROUND
TUNGSTEN CARBIDE EMBEDMENT PROCESS

MANUFACTURING OF TRIBOLOGICAL HARDFACINGS ON PM AND AM ARTICLES

TECHNICAL FIELD

The present technology relates to formation of tribological hardfacings on PM/AM manufactured articles.

BACKGROUND

A major benefit of additive manufacturing (AM) and powder metallurgy (PM) is that geometrically complex parts can be made to near net shape without subtractive machining. AM/PM components now have microstructures equivalent to forged components. Two common AM processes are (i) powder bed fusion (PBF) in which a laser or electron beam is focused to melt and fuse regions of powdered material contained in a powder bed; and (ii) wire fed directed energy deposition (DED) in which a plasma arc melts a wire feedstock as it is fed into the melt pool using technology closely related to welding.

PBF components have as-deposited surfaces typically made up of partially fused powder, presenting a discontinuous surface. The deposition layers may also be visible, despite the fact that surface roughness measurements are no higher when profiles are taken across the layers than when taken along a single layer. The discontinuous surface texture depends on powder particle size, melt parameters, layer thickness and the orientation of surfaces relative to the build plate. Excessive surface roughness and surface discontinuities make inspection difficult and may also reduce performance by providing crack initiation sites. This reduces fatigue resistance and fracture toughness. Although surface finish is continuing to improve, surface machining or shot peening are often needed to improve surface finish. However, internal surfaces and some small features may be difficult to finish in this way.

DED processes have as-deposited surfaces typically made up of visible weld beads resulting in surface waviness of several millimeters. This discontinuous surface is due to large melt pools, which are difficult to manipulate and control, caused by arc or plasma beams which cannot be focused to less than a few millimeters. High deposition rates mean that stress relief heat treatment is normally required, and significant distortion may occur. Machining is, therefore, required both to maintain dimensional accuracy and to improve surface finish.

Classical PM typically involves three stages; powder blending, die compaction and sintering. The powder blending gives the requested material composition, pulverized into small particles, together with additives that are intended to be released during sintering. The die compaction gives the requested shape. Finally, the sintering step binds the material of the powder together without a complete liquifying. This produces precise parts, typically very close to the die dimensions. The porosity is, however, high, typically 5-15%, which thereby gives a discontinuous surface. To obtain special properties or enhanced precision, secondary processing and/or heat treatment often follows.

There are a number of variations of the PM processes, e.g. powder forging, Hot Isostatic Pressing (HIP), Metal injection molding (MIM) and Electric current assisted sintering (ECAS). The different techniques have their particular advantages and disadvantages. Common for the PM processes are, however, that they, before possible secondary processing, produce an object surface that is not fully compact.

Subsequent processing steps may include blasting with a blast media (for example, beads) to create a compressed layer at the external surface. This compressed layer imposes a compressive force on underlying material resisting the propagation of cracks in the main body of the component. However, benefits of an impacting process such as peening or grit blasting may be outweighed by the impacting medium creating dimensional variations and surface deformities which can impair performance of the end product. This would necessitate additional subtractive machining steps to achieve the desired geometry (see e.g. EP3228406A1).

After the impacting process the component and baseplate may then be subjected to a Hot Isostatic Pressing (HIP) step. The HIP process substantially eliminates micro-cracks in the material structure, so improving the properties of the component material.

Hence, as AM/PM technologies weave their way into production, additional post-processing of AM/PM parts is required to meet surface finish requirements set by target applications. An early solution in the additive manufacturing industry was to manually smooth the surface of the part. Depending on the type of part or its design, manually smoothing parts can be labor intensive, time-consuming, inconsistent, cost prohibitive, and potentially damaging to the part. Today, grinding, abrasive flow machining, electropolishing, wire brushing, and a variety of mass finishing processes are commonly used to achieve right dimensional tolerances and surface roughness. Furthermore, AM/PM parts usually retain some porosity which affects the fatigue life. Porosity may bring some challenges for machining as well as undermine the mechanical strength and corrosion resistance of parts. To minimize the adverse effects of porosity, surface densification and vacuum impregnation of parts is often used.

For instance, the technological chain used for PM manufacturing of gears usually includes the following steps: compaction, sintering, surface densification, heat treatment, shot peening, microgeometry grinding and superfinishing.

Some steel types used in additive manufacturing and powder metallurgy are among the hardest in the industry, reaching hardness levels more than 70 HRC. Most traditional surface finishing methods are ineffective for such materials. Electropolishing is a workable alternative to traditional machining, but it comes at a significantly higher cost and produces significant amounts of hazardous waste.

Replacement of one or more of the foresaid processing steps by an alternative finishing method that would offer the same or better performance at a lower cost may bring significant cost savings. Mechanochemical surface finishing is one of such methods that combine operational simplicity, easy scalability, and outstanding performance. While mechanochemical surface finishing can be used as a separate final finishing operation, it is recommended that the AM/PM and surface finishing operations be considered together during the design phase in order to improve the process productivity and minimize the cost per part.

US 2016256975A1 describes the application of a vibratory mass finishing process to finish AM parts. US 2015336233A1 describes the use of an agitator to carry out finishing of internal cavities filled with an abrasive finishing material, where the abrasive material may include dry powder media or a slurry of powder media in a liquid. U.S. Pat. No. 11,118,283B2 describes sequenced pulse reverse waveform surface finishing of additively manufactured parts. US 2022241864A1 and U.S. Pat. No. 11,859,108B2 provide examples of finishing mediums and finishing suspensions used for removing support material and/or for surface finishing of objects made via additive manufacturing techniques. U.S. Pat. No. 10,316,712B2 provides examples of lubricant compositions containing extreme pressure and antiwear additives that are effective for finishing AM parts.

Provision of hardfacings is one approach to obtain at least improved wear-resistance.

RU2072298C1 describes a method for finishing PM sintered parts by embedding specific extreme pressure/antiwear compounds, such as BN, MoS2, and graphite, into the component surface.

From the above presented overview, it is clear that even if AM/PM processes may be efficient for manufacturing of shapes that are difficult to obtain in traditional machining processes, the additional process steps necessary for making the AM/PM articles ready for provision of wear-resistance may be time-consuming, expensive and/or complex. The need for improvement of the overall AM/PM processes is obvious, and in particular for hardfacings based on AM/PM production.

SUMMARY

A general object is therefore to provide an easily applicable method of producing hardfacings on complex-shaped metallic articles manufactured using powder metallurgy (PM) or additive manufacturing (AM).

The above object is achieved by methods according to the independent claims. Preferred embodiments are defined in dependent claims.

In general words, a method for formation of hardfacings on an article comprises producing, by powder metallurgy or additive manufacturing, an article having a discontinuous surface. The article is exposed to impact items and to tungsten carbide particles. The tungsten carbide particles are provided as tungsten carbide particles comprised in the impact items and/or tungsten particles provided directly in a process fluid as a dispersion. At least 80% of the tungsten carbide particles have particle sizes within the range of 0.1-5 μm. The impact items are solid bodies with an average diameter within the range of 0.1 to 10 mm. A velocity difference is created between the discontinuous surfaces of the article and the impact items. This causes impacts between the impact items and the discontinuous surfaces of the article, giving polishing of the discontinuous surface, induction of compressive stress into the discontinuous surface, and/or densification of the discontinuous surface. Tungsten carbide particles are embedded into the discontinuous surfaces of the article, hammering the tungsten carbide particles into the article by use of the energy of the impacts.

One advantage with the proposed technology is that a wear-resistant low-friction surface containing embedded tungsten carbide particles is produced, regardless of the geometrical macroscopic shape of the article being treated, and directly onto an originally discontinuous surface. Other advantages will be appreciated when reading the detailed description.

BRIEF DESCRIPTION OF THE DRAWINGS

The invention, together with further objects and advantages thereof, may best be understood by making reference to the following description taken together with the accompanying drawings, in which:

FIG. 4 is a schematic drawing of an impact item approaching an article surface;

FIGS. 5A-C are sketches of different approaches for creating a velocity difference;

DETAILED DESCRIPTION

Figure 1:
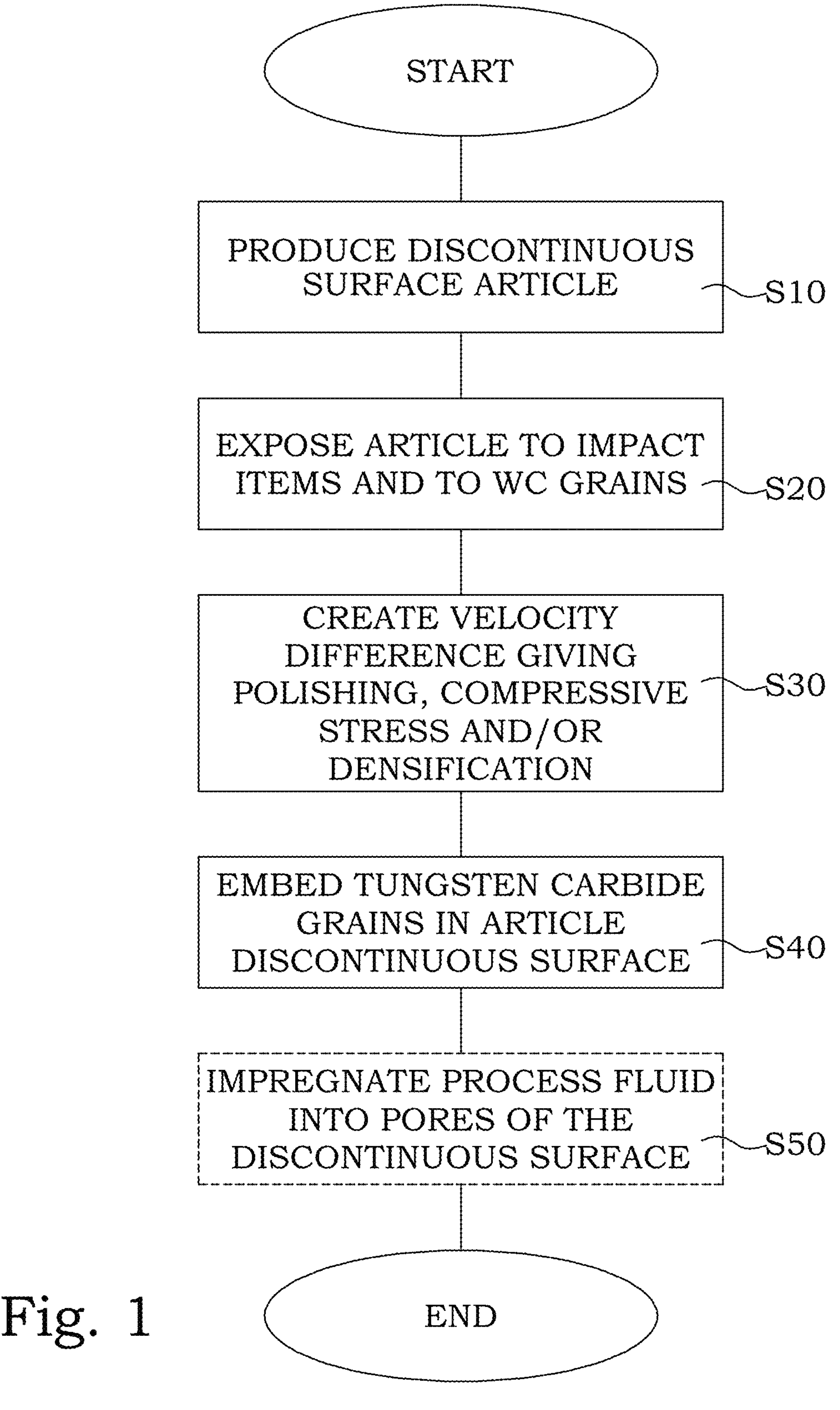
FIG. 1 is a flow diagram of steps of an embodiment of a method for formation of hardfacings on an article with a discontinuous surface.

Throughout the drawings, the same reference numbers are used for similar or corresponding elements.

Additive manufacturing (AM) and powder metallurgy (PM) give rise to discontinuous surfaces. In the context of the present disclosure, and in agreement with the general interpretation in the present field of technology, a discontinuous surface is defined as a surface that retains pores due to incomplete coalescence of compacted metal powder during powder metal sintering or additive manufacturing. The pores are sometimes also referred to as voids. The levels of porosity may vary considerably depending on the material properties and the manufacturing process used. Porosity is defined as the degree of empty space in a material. Low porosity is in general preferred, since it prevents bulk corrosion and improves mechanical strength of AM/PM parts. In general, porosity levels below 0.5 vol. % are considered acceptable. However, porosity to some degree will always be present in AM/PM articles, at least before post-treatments.

Developing new methods of obtaining acceptable surface finish will help to extend the benefits of additive manufacturing and powder metallurgy. Improved understanding of process parameters may reduce distortion and the need to machine surfaces. There is also a need to develop new and improved methods of attaining improved surface finish, which allows internal and delicate features to obtain good surface finish.

The prior art demonstrates that the benefits of hard particle embedment for improving the bearing capacity of surfaces is rather scarce. For example, the published US patent U.S. Pat. No. 4,125,637 A describes a process for forming an extremely hard-wearing bearing surface on a metal machine part by embedding particles of hard grit, such as carbide grit, into the surface using a resiliently-loaded tool, so that the surface becomes permanently encrusted with the particles.

In the published international patent application WO 2023/055274 A1, it described how a mechanochemical surface finishing process can be implemented on different mass finishing platforms. However, its scope is largely limited to conventional wrought or cut from a bar parts. For such parts, the overall processing sequence is different from PM/AM parts. For instance, there is no need to carry out surface densification or vacuum impregnation.

Embedment of abrasive particles into the workpiece during abrasive finishing is, as such, a well-known, but usually undesirable, phenomenon. Embedded abrasive particles are usually detrimental for the tribology since their presence is associated with a decrease in machining efficiency, higher friction and faster wear. Therefore, special measures are typically taken to avoid or minimize particle embedment, e.g. by putting a flushing nozzle at the exit point when grinding, carrying out continuous coolant filtration, redesigning the tool dressing, using a tougher or less friable grit, etc.

When carrying out different mass finishing media screening tests, it was surprisingly discovered that the use of a specific non-abrasive burnishing media type—WC-Co cemented tungsten carbide beads—in particular with a specific particle size distribution, does not only lead to unusually high uptake levels of tungsten in the surface, but allows one to combine several important tasks in a single treatment step, including (i) deburring and edge relief; (ii) surface densification; (iii) strain hardening and compressive stress build-up; (iv) in manufacture running-in with tribofilm priming; and (v) modification of the surface roughness profile with a remarkable drop in the gradient and amplitude surface roughness readings. This allows significant improvement in process economy, as certain pre-processing steps can be skipped. Surface densification should preferably be carried out before the heat treatment to facilitate the transformation of the kinetic energy of the beads into the plastic deformation energy expanded to produce a dense material layer. Sufficient impact energy levels can be provided using shot peening, centrifugal barrel finishing, spindle finishing and stream finishing equipment, see e.g. A. Molinari, E. Santuliana, I. Cristofolini, A. Rao, S. Libardi, P. Marconi, Surface modifications induced by shot peening and their effect on the plane bending fatigue strength of a Cr—Mo steel produced by powder metallurgy, Materials Science and Engineering: A, Volume 528, Issue 6, 2011, pp 2,904-2911.

A Scanning Electron Microscope (SEM) analysis of treated surfaces reveals a high density of embedded WC particles characteristic of Metal Matrix Composite (MMC) type hardfacings. The possibility of manufacturing such MMC coatings using a tribological process was beforehand considered very unlikely and the outcome was therefore totally unexpected. Furthermore, as it turned out, the MMC coatings produced using the tribological process did not require additional finishing as they are “run-in” already in manufacture.

Based on these surprising findings, the inventors caught the insight that it would be highly desirable to produce MMC-like coatings using conventional finishing operations, such as mass finishing. By finding the right process conditions, the particle embedment may be used to achieve significant benefits for the tribological performance, in particular, friction, wear and micropitting of AM/PM parts.

For a better understanding of the proposed technology, it may be useful to begin with a brief overview of mass finishing.

The term “mass finishing” refers to a group of manufacturing processes that allow large quantities of parts to be simultaneously finished. Two broadly used types of mass finishing are tumble finishing, also known as barrel finishing, and vibratory finishing.

Mass finishing uses a grinding contact between the workpiece and the finishing media surfaces to achieve a desired surface finish quality for the workpiece. A variety of finishing media types can be used. Mass finishing can be performed dry or wet. Wet processes use liquid lubricants, coolants or cleaners together with abrasives. Cycle times can vary from minutes to hours depending on the process conditions, workpiece material and the finishing media used. The goal of this type of finishing is to burnish, deburr, clean, radius, de-flash, descale, remove rust, polish, brighten, surface harden, prepare parts for further finishing, or break off die cast runners.

In the present disclosure, the term “media” is used for denoting the entire material, typically comprising solid particles, used for creating interaction with different surfaces during surface treatment processes. The solid bodies in the media are here denoted as “impact items”, typically comprising hard items of different shapes, being able to obtain a certain velocity. Beads of different sizes and composition are a common type of impact items. The media may, besides the impact items, also comprise e.g. different kinds of transporting fluids of various viscosity.

A mass finishing process can be run either as a batch process or as a continuous process, and may also be sequenced, which involves running the workpieces through multiple different mass finishing stages. See e.g. L K Gillespie, “Mass finishing handbook”, Industrial Press, New York, 2007, pp. 781-784.

One remarkable feature of the mechanochemical surface finishing process that makes it especially useful for finishing PM/AM parts is that it can replace one or more processing steps, improving the process economy and reducing the amount of waste. Thus, surface densification, shot peening inducing compressive stress into a surface, and superfinishing or other types of polishing, abrasive as well as non-abrasive, can all potentially be reduced to one single mechanochemical surface finishing operation.

However, the prior art does not contain a realization of non-trivial effects of combining mechanochemical surface finishing with particle embedment for enhancing the tribological properties of AM/PM parts.

FIG. 1 is a flow diagram of steps of an embodiment of a method for formation of hardfacings on an article. In step S10, an article is produced by powder metallurgy or additive manufacturing. The article thus has a discontinuous surface. The article may have substantially any shape, e.g. comprising convex and/or concave curved surfaces and/or surfaces with continuously and/or intermittently changing curvatures. In step S20, the article is exposed to impact items and to tungsten carbide particles. The impact items may e.g. be in the shape of beads. The tungsten carbide particles are provided as at least one of tungsten carbide particles comprised in the impact items and tungsten particles provided directly in a process fluid as a dispersion. Preferably, the article is exposed to impacts from the impact items wetted by a process fluid, in which optionally the tungsten carbide particles are dispersed. As will be discussed further below, the tungsten carbide particles may furthermore be released by the impact items and/or may be provided separately. In other words, the tungsten carbide particles are provided as free tungsten carbide particles and/or tungsten carbide particles comprised in the impact items. The impact items are solid bodies with an average diameter within the range of 0.1 to 10 mm. Preferably, the average diameter is within the range of 0.5 to 5 mm. The choice of impact item size is preferably adapted to the curvatures of the article. In step S30 a velocity difference is created between the discontinuous surfaces of the article and he impact items. This velocity difference causes impacts between the impact items and said discontinuous surfaces of the article. These impacts give rise to polishing of the discontinuous surface, for inducing compressive stress into the discontinuous surface, and/or for densifying the discontinuous surface. In step S40, tungsten carbide particles are embedded into the discontinuous surfaces of the article, hammering the tungsten carbide particles into the article by use of the energy of the impacts. At least 80% of the tungsten carbide particles have particle sizes within the range of 0.1-5 μm.

In a preferred embodiment, at least 80% of the tungsten carbide particles have particle sizes with a maximum diameter within the range of 0.2-2 μm.

Figure 2:
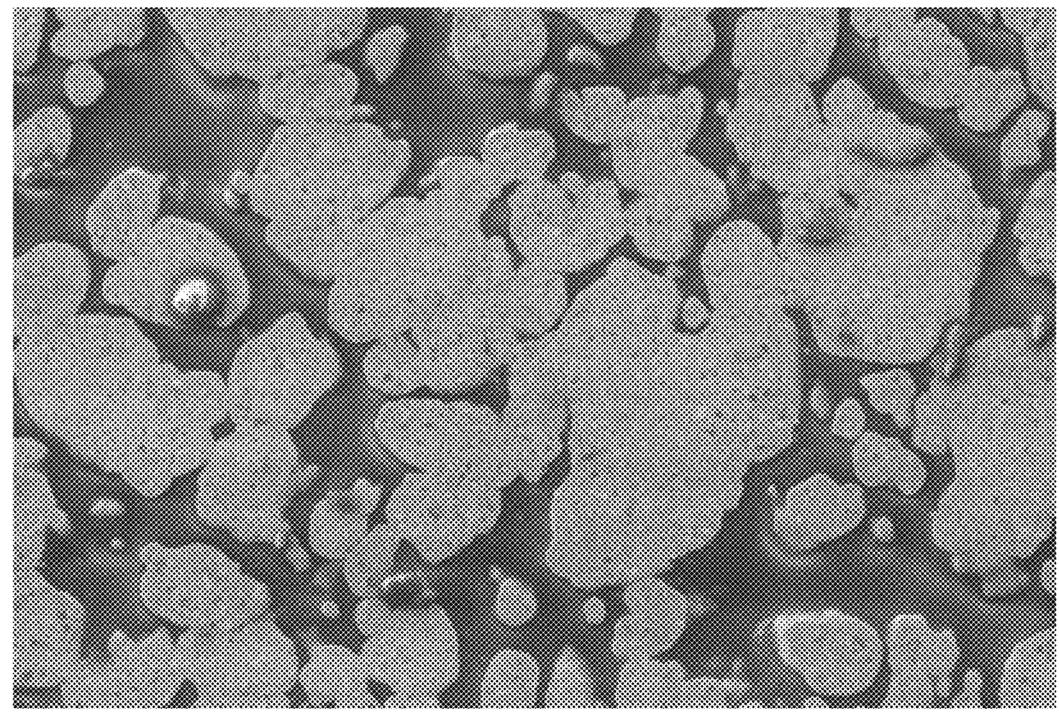
FIG. 2 is a SEM image of a part of a surface of an article manufactured by powder metallurgy.

FIG. 2 illustrates a SEM image of a part of a surface of an article manufactured by powder metallurgy, with a magnification of 1000×. Light areas correspond to sintered metal, and dark areas are pores.

Figure 3:
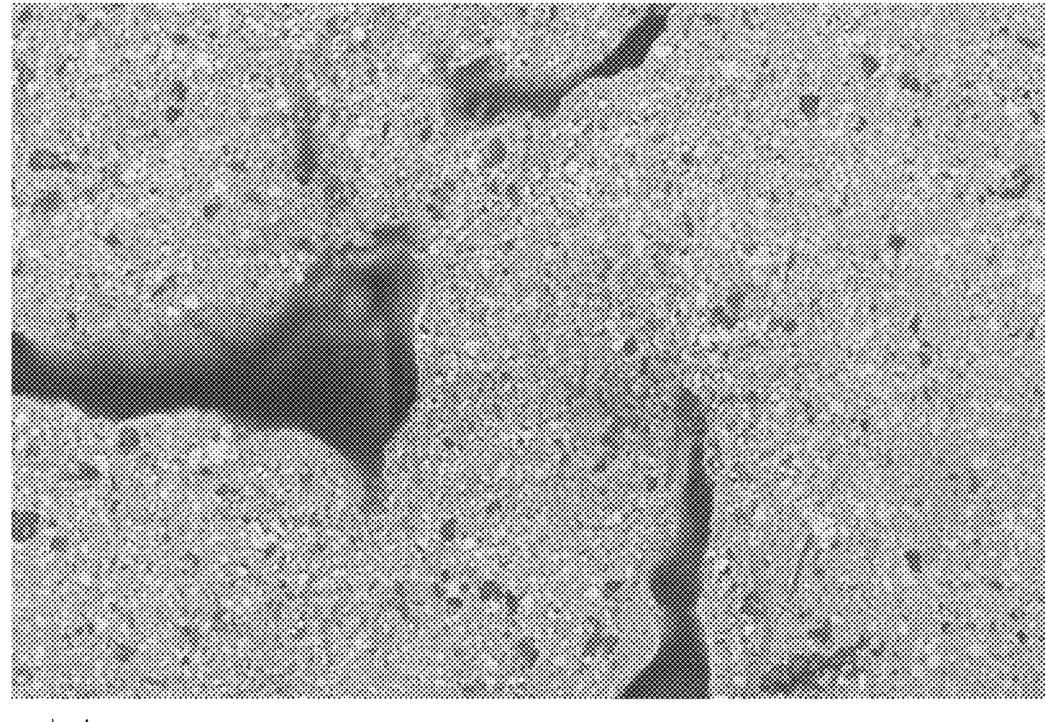
FIG. 3 is the SEM image of FIG. 2 with a higher magnification.

FIG. 3 illustrates a SEM of the part of the surface of the article of FIG. 2, with a magnification of 5000×, where embedded tungsten carbide particles can be seen as white areas at the exposed surface of sintered metal.

There exist several types of tungsten carbides. Fused and crushed tungsten carbides (FTC) have a eutectic microstructure consisting of WC and W2C. The shape is irregular-blocky and the carbon content is typically 3.5-4 wt %. Spherical cast tungsten carbides (SCC) are fused and crushed carbides that are subsequently spheroidized by a plasma torch. Similar to the FTC carbides SCC microstructure consists of WC/W2C eutectic phase. Macro crystalline tungsten carbides, sometimes also called mono crystalline carbide (MTC), consist of hexagonal WC carbide with irregular blocky shape and a typical carbon content of 6.1%. They are thermodynamically more stable than the eutectic WC/W2C carbides, due to their higher melting point and have lower density compared to the eutectic WC/W2C carbides. Macro crystalline WC carbides are less prone to dissolve than eutectic WC/W2C carbides. This leads to a higher volume fraction of non-degenerated WC particles and a superior resistance to abrasive wear. Any type of such tungsten carbides is possible to use for the purpose of creating hardfacings on an article.

In one embodiment, the impact items comprise the tungsten carbide particles. In one group of embodiments, the impact items are made by cemented tungsten carbide, in particular at least one of Co cemented tungsten carbide and Ni cemented tungsten carbide. Typically, the impact items comprise beads or balls. In one preferred embodiment, the impact items are made of Co-cemented tungsten carbide.

To promote adequate particle release and embedment, oblique impact of WC-Co beads onto the workpiece surface is preferred. The impact momentum and energy are preferably high enough to provide a high probability to rip off particles of WC from the impact item and to hammer them into the workpiece. At the same time, the impact momentum and energy should preferably not be too high to prevent surface damage, e.g. impact craters. Harder WC-Co beads made of FTC and having a lower bond strength are preferred for this purpose.

In fact, the selection criteria are in one sense inverse compared to those used in abrasive finishing. Easily friable grit is preferred. Use of low-viscosity and low-lubricity coolants furthermore minimizes impact damping. While the process is also operable in dry conditions, this is not preferrable due to excessive heat generation and dusting. The presence of WC dust in the workshop air poses a major health hazard. WC-Co beads with a hardness 750 to 2200 Hv, and preferably 1600 to 2200 Hv, modulus of 450 to 650 GPa, and preferably 550 to 650 GPa, and compressive strength of 3 to 9 GPa, and preferably 6 to 9 GPa, were found to be very usable. Furthermore, a polydisperse particle size distribution in the range from 0.1 to 2 μm, and preferably 0.2 to 1 μm, and cobalt content from 2 to 20%, and preferably 5 to 15% appear to be very suitable for the presently presented process. With such impact items, process was obtained, which aims at producing an MMC-like hardfacing by particle embedment. This includes WC-Co materials commonly used in wear parts, cutting tools, composite machining and wire drawing applications.

In other words, in one embodiment, the material of the impact items comprises 2-20% by weight of Co, preferably 5-15% by weight of Co, and most preferably 5-10% by weight of Co, and have a hardness of 750 to 2200 Hv, preferably 1600 to 2200 Hv, a modulus of 450 to 650 GPa, preferably 550 to 650 GPa, and a compressive strength of 3 to 9 GPa, preferably 6 to 9 GPa.

The mechanical properties of WC-Co beads strongly depend on the size of the WC particles, with smaller particle being associated with increased hardness, wear resistance, compressive strength and transverse rupture strength. According to the particle size classification by Fachverband Pulvermetallurgie, see e.g. Ortner, H. M., Ettmayer, P., Kolaska, H., "The history of the technological progress of hardmetals", in International Journal of Refractory Metals and Hard Materials, 44 (2014) 148-159, the aforesaid preferred range of 0.2 to 1 μm covers ultrafine, submicron and fine particle sizes.

So far, the WC particles have been described as being provided as an embodied component in the impact items. However, alternatively or as a complement, WC particles may be provided directly in the process fluid or coolant as a dispersion or slurry. In this case, other non-abrasive impact items can be used, such as steel or ceramic balls. Therefore, in one embodiment, the tungsten carbide particles are suspended in the process fluid. The impact items then preferably comprise WC-Co, WC-Ni, steel, and/or ceramic items.

If WC-Co impact items are used as a source of WC particles to be transferred to the workpiece, impact item wear occurs with a gradual weight loss. At some point, the impact items will inevitably become too light to deliver sufficient impact energy and need to be replaced. Besides that, some impact items may start to disintegrate due to fatigue. To extend the useful service life of media, external WC particulate matter can be fed into the system, as indicated above. This is an advantageous way since it offers a high degree of flexibility and control over the particle size. Furthermore, WC-Co impact items with the highest degree of abrasion resistance can then be used since no friable grit is needed in this case. Without using an external WC particulate feed, the media life can be limited to 100-200 hours in a high intensity centrifugal finishing process, while with an external WC particulate source, it may well exceed 500 hours.

As preferred impact item size is concerned, the practical size range useable in a wet process carried out with neat oil or water-based process fluid is 0.5 to 5 mm. The smallest impact item size is determined by fluid velocity. Since the G-force is counteracted by the viscous drag, the following scaling relationship is to prefer:

$$G \cdot \text{impact item density} \cdot r^3 = \text{fluid viscosity} \cdot \text{impact item velocity} \cdot r \quad (1)$$

where G is the acceleration, e.g. due to centrifugal action or vibration, and r is the radius of the impact item.

Hence, maximum impact velocity of the impact items will scale as $G \cdot \text{density} \cdot r^2/\text{viscosity}$. Therefore, the impact energy decreases rapidly with reducing the impact item size. The practical viscosity range for process fluids used in the process is 1 to 10 cP, which makes it difficult to achieve sufficient impact energy for impact item sizes below 0.5 mm in diameter when using standard mass-finishing platforms. In other words, in one embodiment, the process fluid with the impact items has a viscosity of 1 to 10 cP at room temperature.

In FIG. 4, a workpiece or article 10 to be treated with a discontinuous surface 12 to be treated is illustrated together with an impact item 20. The impact item 20 is wetted with a process fluid 24 and the impact item 20 incorporates tungsten carbide particles 22, which may be released from the impact item 20 to become embedded tungsten carbide particles 14 when the impact item 20 hits the surface 12 with a velocity V. As illustrated, the maximum impact item 20 size, defined by the radius r, should not exceed the minimum curvature radius min (Rc) of concave portions of the surfaces 12, r<min(Rc), of the workpiece 10. Otherwise, parts of the surface 12 having a smaller curvature radius will be inaccessible for the impact of the impact items. This means that the choice of impact items may be workpiece-dependent and no general upper limit, as such, can be set based on such considerations.

Another limitation of the size comes from excessive edge erosion caused by heavy impact items. Therefore, it is typically impractical to use WC-Co impact items with a diameter over 5 mm. Preferably, impact items should be 3 mm or smaller. In some cases, the use of a mixture of different impactor sizes—for instance, 1 and 3 mm—may be a preferred option to achieve both adequate surface accessibility and impact energy.

Different non-abrasive impact item shapes can also be used if it is expedient. Spherical forms, such as beads are useful for most applications. However, also other shapes may be of use, such as e.g. tubes, parallelepipeds, and pyramids as non-exclusive examples. When using impact items with a high aspect ratio also rotations may influence the impact energy.

In other words, in one embodiment, the impact items have an average diameter within the range of 0.5-5 mm, and preferably within the range of 1-3 mm.

Different mass finishing platforms use different ways to create relative motion between the impact items and the article to be processed. The article can be fixed, e.g. attached to a fixture, or free, e.g. buried in the impact item bulk. For most finishing platforms, it has been found that the velocity difference preferably is within the range of 0.5-5 m/s, to achieve a good embedding action.

Vibratory finishers use periodic mechanic motion of a container containing the impact items 20 and the article 10. This principle is schematically illustrated in FIG. 5A. G-forces are controlled by the amplitude and frequency of the vibrations, see e.g. Zhang, C., Liu, W. Wang, S., et al., "Dynamic modeling and trajectory measurement on vibratory finishing", in The International Journal of Advanced Manufacturing Technology 106 (2020) 253-263.

The process kinetics depend on the bowl dimensions, and the amplitude and frequency of vibrations. The resulting impact item velocity is proportional to the product Amplitude·Frequency. The forces are proportional to the product Amplitude·Frequency$^2$. The vibration amplitude depends on the eccentricity, i.e. the distance between the mass centroid of the eccentric weight and the shaft, and the weight ratio eccentric weight/bowl weight, including the impact items, fluid and article. The friction between the impact items, the article and the bowl acts as a damping factor. The energy supplied to the system is largely dissipated as friction heat. The vibration amplitude may vary from a few mm to a few cm. The typical impact item velocity range is typically 0.1 to 1 m/s. With a vibratory finisher operating at 50 Hz frequency and with a 5 mm amplitude, when using 2 mm WC-Co beads, the formation of an MMC-like hardfacing can be accomplished within 1-2 hours. A high intensity vibratory finishing process can provide the same impact energy as a low intensity stream finishing process. See e.g. Kacaras, A., Gibmeier, J., Zanger, F., Schulze, V., "Influence of rotational speed on surface states after stream finishing", in Proc. CIRP 71 (2018) 221-226.

Stream- and drag-finishing differ mostly by what is moving: the impact items or the article. In stream finishing, the impact items move against the fixed, or possibly rotated, article. In drag finishing, as illustrated schematically in FIG. 5C, the article 10 is dragged through the immobile bed of impact items 20. The article 10 has to be attached to a holder and can eventually be rotated or tilted to prioritize treatment of specific areas.

Stream finishing operations, schematically illustrated in FIG. 5B, are usually carried out using impact item velocity from 0.1 to 5 m/s. See e.g. Kacaras, A., Gibmeier, J., Zanger, F., Schulze, V., "Influence of rotational speed on surface states after stream finishing", in Proc. CIRP 71 (2018) 221-226. To promote adequate particle embedment and at the same time avoid article damage when using WC-Co beads as the finishing impact items, the range from 0.5 to 5 m/s is presently considered as being more appropriate. Smaller bead size requiring higher velocity to achieve the desired effect.

In drag finishing, the impact items and the process fluid are typically placed inside a bowl. The article is attached to a holder, submerged among the impact items bed and dragged at a certain speed. To guarantee adequate particle embedment and at the same time avoid article damage when using WC-Co beads as the finishing media, the range from 0.5 to 5 m/s is typically appropriate, the same as for stream finishing. When using 2 mm WC-Co beads, the typical treatment time ranges from a few minutes to a half hour.

In centrifugal barrel finishing, turret rotation is used to control the G-force. The local situation will be similar as in drag finishing, but with the article following a rotation path. In a typical application, the article is placed inside a barrel, together with impact items and process fluid. The combined fill rate of impact items and fluid inside the barrel is typically 50-90%, of which the impact item fill rate typically is 20-80%, but preferably 40-60%. The barrels sit in cradles which are mounted on a turret. The turret rotates around a horizontal axis, creating a Ferris wheel-like motion with a one-to-one ratio of barrel rotation to turret rotation. Inside the barrels, the rotating motion induces collisions between impact items and article, altering the surface finish of the article and causes tungsten carbide particles to be embedded. The process kinetics depends on barrel and turret dimensions. For barrels of 20 cm diameter, and turret of 60 cm diameter, the turret should typically rotate at 150-220 rpm. 160-180 rpm has been found to be the optimal window. The speed scales up with dimensions to keep the factor diameter·rpm$^2$ constant. The treatment time can vary from a few minutes up to an hour, but in most cases the 10-30-minute interval is targeted.

A lot of hybrid solutions also exist. For instance, one can fix the article and induce the media flow in a vibratory finisher by choosing the right vibration mode.

Shot-peening and abrasive flow machining (AFM) systems may also be adapted for the purpose of the current invention, the AFM technique being suitable for the treatment of internal cavities. In shot peening, the impact items are accelerated using compressed air. In abrasive flow machining, the impact items are set into motion by hydrodynamic forces. However, an impact item speed of 10-100 m/s, which may be considered as a standard speed in conventional shot-peening, may be too high at least if dense media are used. In such cases, it is thus preferred to use less dense media or lower speed.

In one embodiment of a method for formation of hardfacings on an article, the step of creating a velocity difference is achieved using centrifugal barrel finishing, vibratory finishing, spindle finishing, stream finishing, drag finishing, shot peening and similar platforms.

While particle embedment can also be achieved in dry conditions without using any process fluid, this is not desirable due to excessive dusting, with air borne WC dispersions posing a major health safety hazard.

In general, two types of process fluids are most suitable for use according to the present technology: neat oils and water-borne synthetic fluids. In other words, in one embodiment, the exposing of the article comprises exposing the article to the process fluid in which the impact items are provided and in which the tungsten carbide particles are provided. The process fluid comprises neat oils or water-borne synthetic fluids.

As mentioned above, two types of process fluids are most suitable for use according to the present technology: neat oils and water-borne synthetic fluids. The following examples show some typical possible formulations of the process fluid:

Neat Oil—For General Use

Solvent, Exxsol D100, ExxonMobil 96 wt. %

Sulfurized olefin, Additin RC 2540, Rhein Chemie 2 wt. %

Zinc dialkyl dithiophosphate, Lubrizol 1371, Lubrizol 2 wt. %

Antioxidant, Rianox 1135, Rianlon 500 ppm

Antifoam, Viscoplex 14-520, Evonik 200 ppm

This product has a kinetic viscosity at 25° C. of 2.7 cSt, a specific gravity of 0.83 g/cm3 and a flash point of 100° C.

Neat Oil—For Improved Scuffing Resistance

Solvent, Exxsol D100, ExxonMobil 88 wt. %

Sulfurized fatty acid ester, Na-lube EP-5218, King Industries 10 wt. %

Aminophosphate, Nu-lube AW 6110, King Industries 2 wt. %

Antioxidant, Rianox 1135, Rianlon 500 ppm

Antifoam, Viscoplex 14-520, Evonik 200 ppm

This composition gives a kinetic viscosity at 25° C. of 3.9 cSt, a specific gravity of 0.84 g/cm3 and a flash point of 100° C.

Water-borne synthetic fluid

Water . . . 60 wt. %

Propylene glycol 30 wt. %

Water soluble polyalkylene glycol (Breox 50 A 20, BASF) 5 wt %

Corrosion inhibitor (SR1, Chemworld) 5 wt %

Antifoam (DOWSIL™ AFE-1267, Dow) 500 ppm

This composition gives a kinetic viscosity at 25° C. of 1.7 cSt and a specific gravity of 1.0 g/cm3.

Since the present disclosure is targeted to AM/PM processes giving a porous or at least discontinuous surface, the process fluid used may additionally be selected considering the porous nature of the article. During the treatment with a process fluid in contact with the discontinuous surface of the AM/PM article, some of the process fluid will enter into the discontinuous surface. Depending on e.g. the viscosity of the process fluid and the porosity of the article, the process fluid may also penetrate further into the material. In some applications, such penetration may be cumbersome and a process fluid with a relatively high viscosity may then be selected in order to minimize any such penetration.

However, for other applications, penetration of process fluid into the article could be of benefit. If the article for instance is an article that during its use should be lubricated, lubricants being contained in pores in the article may assist. In particular, if the article is exposed to pressures during its use, the pressure may squeeze out some of the process fluid from the pores, and if such process fluid has lubricating properties, this may be of advantage. In such applications, the process fluid can be selected with a viscosity that is low enough to enable impregnation of pores of the article, but still high enough to allow subsequent reemission during use of the article.

Similar advantages may also be present in applications where corrosion protection is of importance. Process fluids having anti-corrosion properties may give an improved protection to the article if parts of the process fluid remain in pores of the article.

In other words, in one embodiment, the method for formation of hardfacings on an article comprises the further step of impregnating the process fluid into pores of the discontinuous surface.

Therefore, before any mechanochemical superfinishing step, it may be useful to impregnate the residual pores present in AM/PM parts by a special anticorrosive composition. This operation is highly recommended if the parts are to be exposed to temperature cycling in a humid atmosphere, carrying an increased risk of water condensation and internal corrosion in pores, that may undermine the structural integrity of the parts.

Some examples of the impregnating oils are shown below:

General Purpose:

Base oil, 600N, Chevron 98.3 wt. %

Zinc dialkyldithiophosphate, OLOA 4269N, Oronite 1.0 wt. %

Oxidation inhibitor, OLOA 4860, Oronite0.5 wt. %

Rust inhibitor, OLOA 233FA, Oronite 0.2 wt. %

Non-bleeding heavy-duty corrosion protection:

Base oil, 600N, Chevron 88.0 wt. %

Rheology modifier, Crayvallac antisettle CVP 2.0 wt. %

Rust inhibitor, Vanlube 8912E, Vanderbilt 5.0 wt. %

Rust inhibitor, Vanlube RI-A, Vanderbilt 5.0 wt. %

Ultralow friction impregnating oil

PFPE oil, TOPDA B-260 100 wt. %

RoHS-free biobased oil

Dehylub 4145, Emeryoleo 77.9 wt. %

Boiled linseed oil, Ovolin 20.0 wt. %

Rheology modifier, Crayvallac antisettle CVP 2.0 wt. %

Rust inhibitor, OLOA 233FA, Oronite 0.1 wt. %

Here below are a few examples of tests of treatments on articles having discontinuous surfaces.

Example 1: PM Pins

Sintered powder metal pins, 10 mm diameter, were made of Astaloy CrA, (Fe-1.8% Cr). They were sintered and low pressure carburized, giving a density of 7.2 g/cm3, and a hardness of HRC 60. The metal pins were finished using the above-presented mechanochemical process.

TABLE 1

Change in the surface roughness parameters of powder metal pins treated according to the disclosed method.

| Roughness Parameter, [μm] | Before treatment | After treatment |
|---|---|---|
| Ra | 0.44 | 0.17 |
| Rpk | 0.42 | 0.12 |
| Rk | 1.45 | 0.5 |
| Rvk | 0.54 | 0.38 |
| Rsk | −0.17 | −1.2 |

Surface roughness parameters Ra, Rpk, Rk, Rvk and Rsk defined as per ISO 1302 were measured before and after the treatment. The results are presented in Table 1.

X-ray Fluorescence (XRF) measurement also confirmed that treated pins feature an MMC-like layer due to embedded WC particles.

Example 2: PM Gears

A set of spur gears made of 16MnCr5 gearing steel, with a hardness of HRC 50, were finished using the above-presented mechanochemical superfinishing process on a stream-finishing machine. Table 2 shows the changes in the surface roughness parameters defined as per ISO 1302.

TABLE 2

Change in the surface roughness parameters of gears before and after the treatment.

| Roughness Parameter, [μm] | Conventionally ground gears | Mechanochemically superfinished gears |
|---|---|---|
| Ra | 0.59 | 0.25 |
| Rz | 4.17 | 2.14 |
| Rpk | 0.72 | 0.16 |
| Rk | 1.88 | 0.62 |
| Rvk | 1.05 | 0.85 |
| Rsk | −0.04 | −1.75 |

The formation of an MMC-like surface coating has been confirmed by scanning electron microscopy (SEM) imaging and elemental analysis using energy dispersive X-ray analysis (EDX). The compressive residual stress in the topmost material layer increased from 900 to 1400 MPa, based on X-ray diffraction (XRD) analysis.

Figure 6:
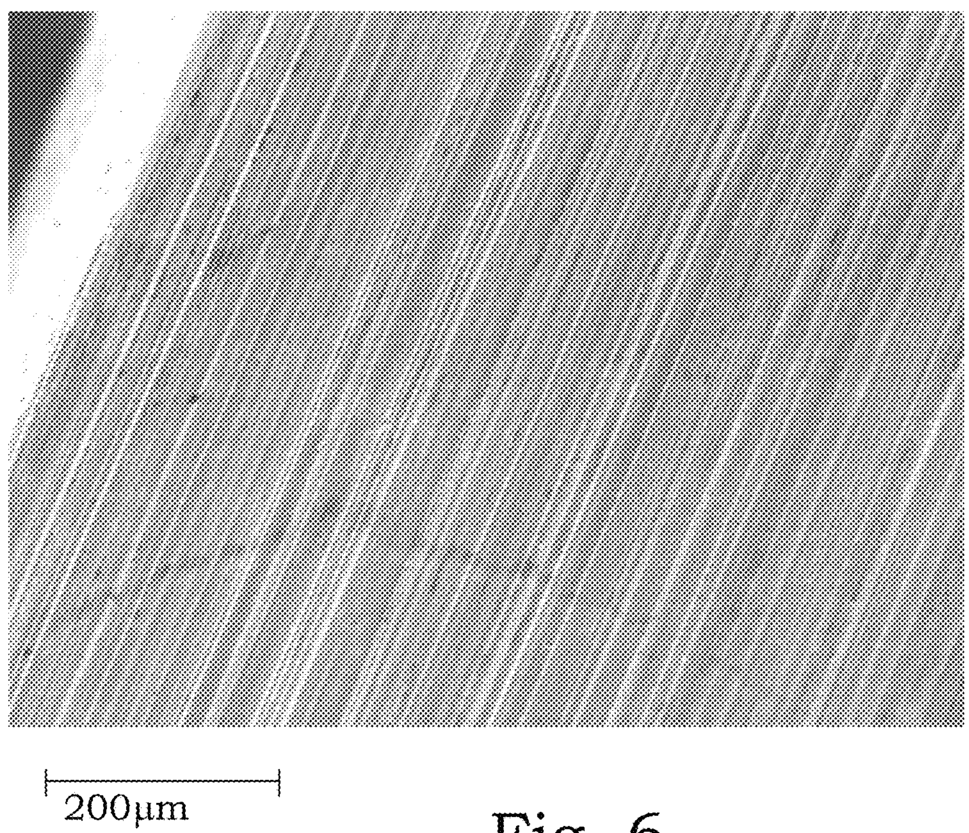
FIG. 6 is a SEM image of a conventionally ground gear surface.
Figure 7:
FIG. 7 is a SEM image a gear surface after treatment with the present treatment.

In FIG. 6, a SEM image of the conventionally ground gear surface is illustrated. In FIG. 7, a SEM image of the gear surface after treatment with the present treatment giving a mechanochemically superfinished surface.

Figure 8:
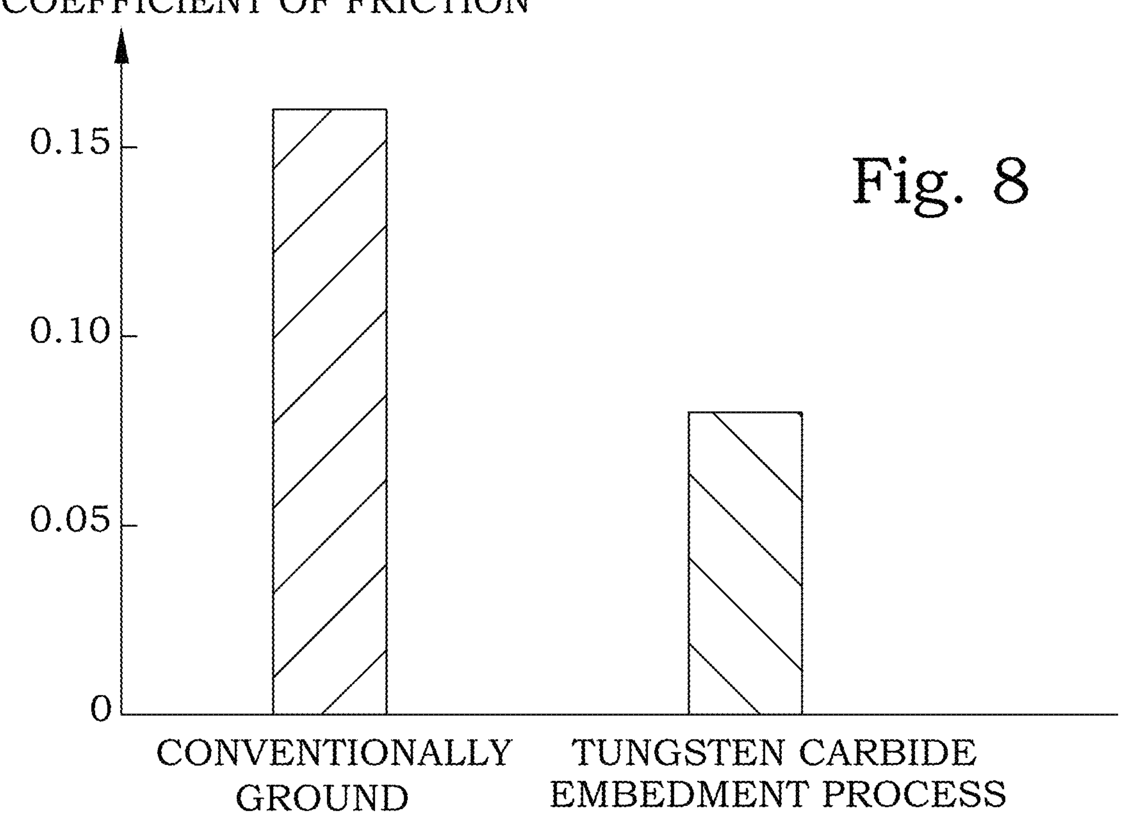
FIG. 8 is a diagram illustrating coefficients of friction of a conventionally ground article and an article treated with the present tungsten carbide embedment process.

FIG. 8 shows typical boundary friction coefficients for a lubricated sliding steel/steel contact between conventionally ground and mechanochemically superfinished surfaces. The improvement of surface roughness of the items treated by the presently proposed tungsten carbide embedment process is striking. A smoother surface is obtained despite the embedment of tungsten carbide particles. In such a way, lower friction as well as increased wear resistance is achieved.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, strictly defined by the appended claims.

The invention claimed is:

1. A method for formation of hardfacings on an article, comprising the steps of:

producing, by powder metallurgy or additive manufacturing, an article having a discontinuous surface;

exposing said article to impact items and to tungsten carbide particles;

said tungsten carbide particles being provided as at least one of tungsten carbide particles comprised in said impact items and tungsten particles provided directly in a process fluid as a dispersion;

wherein at least 80% of said tungsten carbide particles have particle sizes within the range of 0.1-5 μm;

wherein said impact items being solid bodies with an average diameter within the range of 0.1 to 10 mm;

creating a velocity difference between said discontinuous surfaces of said article and said impact items, which causes impacts between said impact items and said discontinuous surfaces of said article, giving at least one of:

polishing of said discontinuous surface, inducing compressive stress into said discontinuous surface, and densifying said discontinuous surface; and embedding tungsten carbide particles into said discontinuous surfaces of said article, hammering said tungsten carbide particles into said article by use of the energy of said impacts.

2. The method according to claim 1, wherein said step of exposing said article comprises exposing said article to said process fluid in which said impact items are provided and in which said tungsten carbide particles are provided, and by the further step of:

impregnating said process fluid into pores of said discontinuous surfaces.

3. The method according to claim 2, wherein said process fluid with said impact items has a viscosity of 1 to 10 cP at room temperature.

4. The method according to claim 3, wherein said process fluid comprises neat oils or water-borne synthetic fluids.

5. The method according to claim 3, wherein at least 80% of said tungsten carbide particles have particle sizes within the range of 0.2-2 μm.

6. The method according to claim 2, wherein said process fluid comprises neat oils or water-borne synthetic fluids.

7. The method according to claim 6, wherein at least 80% of said tungsten carbide particles have particle sizes within the range of 0.2-2 μm.

8. The method according to claim 2, wherein said tungsten carbide particles are suspended in said process fluid and said impact items comprise at least one of:

WC-Co,

WC-Ni, steel, and ceramic items.

9. The method according to claim 2, wherein at least 80% of said tungsten carbide particles have particle sizes within the range of 0.2-2 μm.

10. The method according to claim 1, wherein at least 80% of said tungsten carbide particles have particle sizes within the range of 0.2-2 μm.

11. The method according to claim 10, wherein at least 80% of said tungsten carbide particles have particle sizes within the range of 0.2-2 μm.

12. The method according to claim 1, wherein said impact items comprise said tungsten carbide particles.

13. The method according to claim 12, wherein said impact items are made of Co-cemented tungsten carbide.

14. The method according to claim 13, wherein said impact items comprise 2-20% by weight of Co, preferably 5-15% by weight of Co, and most preferably 5-10% by weight of Co, and have a hardness of 750 to 2200 Hv, preferably 1600 to 2200 Hv, a modulus of 450 to 650 GPa, preferably 550 to 650 GPa, and a compressive strength of 3 to 9 GPa, preferably 6 to 9 GPa.

15. The method according to claim 1, wherein said impact items have an average diameter within the range of 0.5-5 mm, and preferably within the range of 1-3 mm.

16. The method according to claim 1, wherein said step of creating a velocity difference is achieved using one of the following platforms:

centrifugal barrel finishing,
vibratory finishing,
stream finishing,
spindle finishing
drag finishing, and
shot peening.

17. The method according to claim 1, wherein said velocity difference is within the range of 0.5-5 m/s.

18. The method according to claim 1, wherein the step of producing an article having a discontinuous surface is performed by powder metallurgy.

19. The method according to claim 1, wherein the step of producing an article having a discontinuous surface is performed by additive manufacturing.

20. The method according to claim 1, wherein the step of creating a velocity difference between said discontinuous surfaces of said article and said impact items gives at least one of:

polishing of said discontinuous surface, and
densifying said discontinuous surface.

* * * * *